US006185192B1

(12) United States Patent
Homer et al.

(10) Patent No.: US 6,185,192 B1
(45) Date of Patent: Feb. 6, 2001

(54) PROCESS FOR FETCHING OUT ERROR STATISTICS DATA

(75) Inventors: Russell Homer; Helmut Brazdrum, both of Munich (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/043,715

(22) PCT Filed: Sep. 26, 1996

(86) PCT No.: PCT/DE96/01844

§ 371 Date: Mar. 24, 1998

§ 102(e) Date: Mar. 24, 1998

(87) PCT Pub. No.: WO97/12462

PCT Pub. Date: Apr. 3, 1997

(30) Foreign Application Priority Data

Sep. 26, 1995 (DE) .............................................. 195 35 800

(51) Int. Cl.[7] ....................................................... H04J 1/16
(52) U.S. Cl. .......................... 370/252; 370/218; 370/242; 370/362; 370/395
(58) Field of Search ................................... 370/252, 395, 370/389, 362, 242, 218

(56) References Cited

FOREIGN PATENT DOCUMENTS 42 27 118     11/1993  (DE) .
WO 93/03567    2/1993  (WO) .

OTHER PUBLICATIONS

AT&T Technical Journal, vol. 72, No. 6, Nov. 1993, XP 000434018, Mark A. Pashan, Technologies for Broadband Switching, pp. 39–47.

*Primary Examiner*—Hassan Kizou
*Assistant Examiner*—Mitchell Slavitt
(74) *Attorney, Agent, or Firm*—Schiff Hardin & Waite

(57) ABSTRACT

For implementing the method for reading error statistics data, a hardware configuration has processing units (CTR0, CTR1) that operated in microsynchronous parallel operation for the processing of ATM information. The processing units are connected at the ATM end to a switching matrix (SN0, SN1) and via a bus interface (B-I) to a central processor. The central processor is used for evaluating error statistics arising in the processing units and for monitoring the synchronous operation by comparing the processing results. The error statistics data is packed into ATM transmitter cells and looped back via the switching matrix in each case to both processing units and then supplied to the central processor via the bus interface. This prevents the erroneous indication of the loss of microsynchronism when error statistics for the two processing units differ.

2 Claims, 1 Drawing Sheet

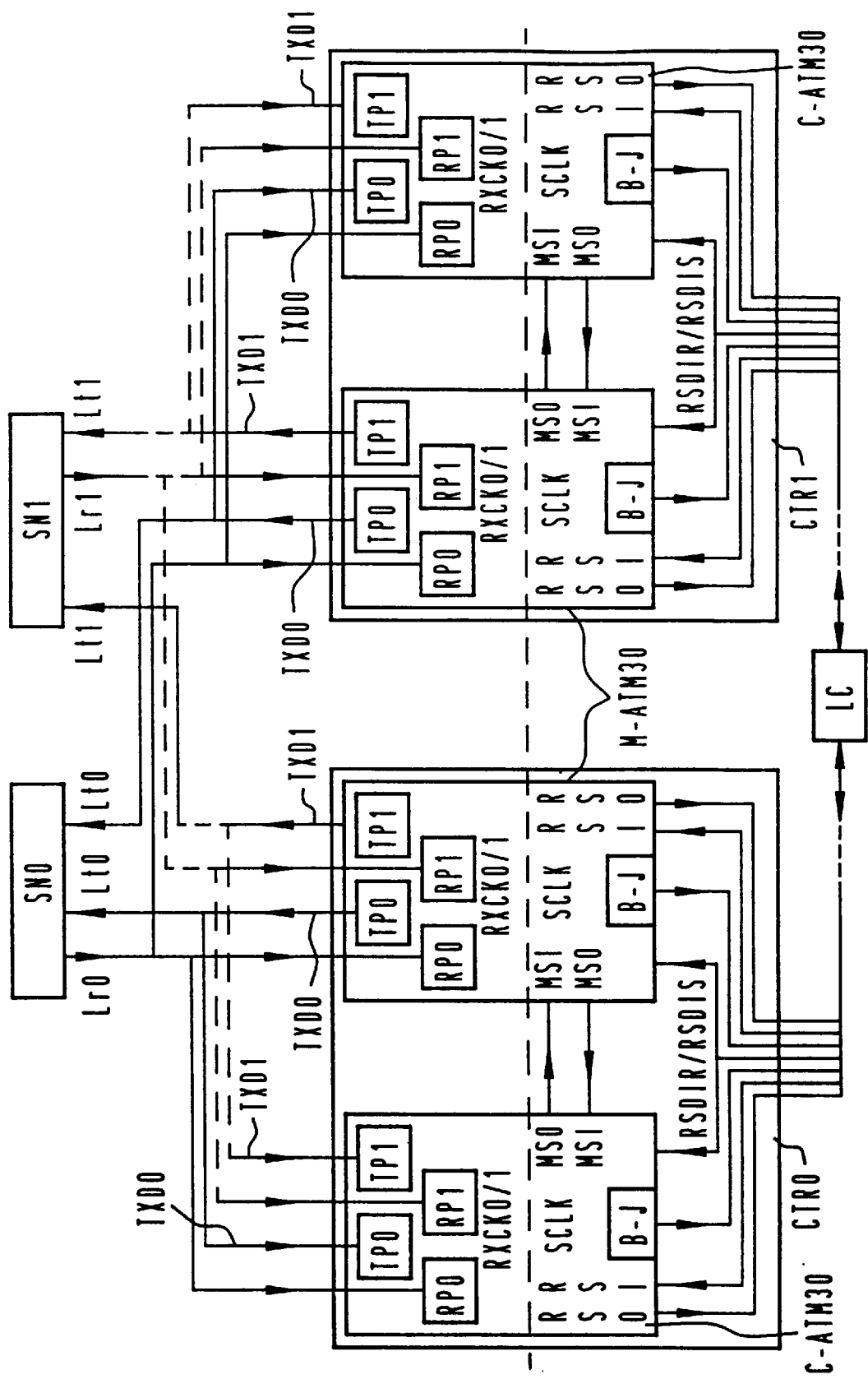

PROCESS FOR FETCHING OUT ERROR STATISTICS DATA

BACKGROUND OF THE INVENTION

The invention relates to a method for reading out error statistics data which are produced in duplicate processing units.

Accordingly, this concerns the reading out of error statistics data which arise in duplicated processing units operated in microsynchronous parallel operation for processing ATM information. In this arrangement, the processing units are connected to a switching matrix which may be duplicated. They output in each case, for generating the microsynchronous parallel operation, a synchronization signal identifying the corresponding processing phase if the received information to be processed is free of errors and, respectively, the results of the information processing to be sent out are free of errors, to the partner unit, to which synchronization signal the beginning of the processing phase of the latter unit is synchronized. If there is no synchronization signal from the partner unit, the processing unit concerned, however, stops information processing, that is to say rejects the received information even in the case of correct reception of information just as in the case of faulty information. This correspondingly applies to the transmitter direction. In this case, blank information is output even though a faultless information processing result is given.

The processing units are connected via a bus interface to a central control unit which compares information items reaching it with one another, among other things for monitoring the microsynchronous operation of the processing units.

In the case of the constellation described, different error situations can arise in the duplicated processing units so that the error statistics are also different without this having to interfere with the microsynchronous parallel operation.

If any error statistics data were being read out like ATM information directly via the abovementioned bus interface for the purpose of evaluation and thus also subjected to a comparison, it would be highly probable that an inequality and thus erroneously the loss of microsynchronism would be signalled.

SUMMARY OF THE INVENTION

It is therefore the object of the invention to specify a method which allows a read out of the error statistics data without this effect occurring, and the performance of which does not require any additional hardware expenditure and only little additional control expenditure.

In general terms the present invention is a method for reading out error statistics data, the statistics data being produced in duplicated processing units for processing ATM information operated in microsynchronous parallel operation, the processing units being connected to a duplicated switching matrix. For generating microsynchronous parallel operation, the processing units in each case output a synchronization signal identifying the corresponding processing phase to the partner unit in the case of freedom from errors of a received ATM information item to be processed and in the case of freedom from errors of an information processing result to be output, to which synchronization signal the beginning of the processing phase of the partner unit is synchronized. In the case of a lack of a synchronization signal from the partner unit, however, the processing unit affected stops information processing even in the case of the correct reception of an ATM information item just like during the reception of a faulty ATM information item. Alternatively, it outputs a blank information item even in the case of an undisturbed information processing result. The processing units are also connected via a bus interface to a central processing unit, which among other things also evaluates the statistics data reaching it. Information coming from a switching matrix part reaches both processing units and information sent out by a processing unit is supplied to all existing switching matrix parts. For monitoring the microsynchronous operation of the processing units, the information items output by these units in each case via the bus interface are compared for a match. The error statistics data is inserted in the processing units like processing results into ATM transmit cells which are sent to the switching matrix and which are addressed to their point of origin and therefore, after corresponding switching-through, again reach the relevant processing unit as ATM receive cells and reach the central control unit via the associated bus interface like other ATM information.

Advantageous developments of the present invention are as follows.

In the case of an active/standby mode of the processing units, in which the processing unit which is in the standby state, sends blank information in the ATM information cells, the sending-out of statistics data by this processing unit is effected as follows. An internal control command bit, which initiates the sending-out of ATM cells with blank information in the case of a match or non-match, depending on specification, with an external control command bit supplied by a higher-level controller and determining the standby mode of the processing unit, selectively for the ATM cells into which the statistics data are to be inserted, is to be inverted compared with the state assumed in standby mode.

Accordingly, the solution according to the invention amounts to treating the error statistics data like the results of the information processing of ATM information items by the processing units but, at the same time, ensuring that after these have been sent out to the circuit network for transmitting ATM information, to which the processing units are connected, they are transmitted back again like ATM information items to be processed and during this process reach both processing units because of the assumed duplication operation. As a consequence of this, both processing units in each case supply matching error statistics data at the same time via the bus interface, which data in each case relate to one of the processing units so that differences in the error statistics data existing per se for the two processing units do not lead to erroneous signalling of a loss of microsynchronism. A further development of the invention error statistics data is read out even when the processing units operate in active/standby mode in which the processing unit which is in standby state sends blank information in the ATM information cells and makes it possible that statistics data of this processing unit can also be read out without requiring an active/standby change of the processing units to be effected.

BRIEF DESCRIPTION OF THE DRAWING

The features of the present invention which are believed to be novel, are set forth with particularity in the appended claims. The invention, together with further objects and advantages, may best be understood by reference to the following description taken in conjunction with the accompanying drawing, in which:

The Single FIGURE is a block diagram depicting two processing units that utilize the present invention.

DESCRIPTION OF THE PREFERRED EMBODIMENTS

In the single FIGURE, two processing units CTR0 and CTR1 for processing ATM information are shown. These processing units are connected to a switching matrix which, in the case shown, exhibits duplicated parts SN0 and SN1. The processing units CTR0 and CTR1 are connected via a network of receive lines Lr0, Lr1 and transmit lines Lt0, Lt1 for the transmission of ATM information to the switching matrix parts SN0 and SN1 in such a manner that ATM information coming from each switching matrix part similarly reaches both one and the other processing unit (via their receive inputs RP0 and RP1) and that ATM information output by these processing units similarly can be supplied to both switching matrix parts SN0 and SN1 via transmit outputs TP0 and TP1.

The processing units CTR0 and CTR1 here in each case exhibit two processing components C-ATM30 and M-ATM30 which operate in a so-called master/checker configuration, that is to say in the checker processing component C-ATM30, the transmit outputs TP0 and TP1 are connected as inputs which receive as input information ATM transmit information output by the transmit outputs TP0 and TP1 of the in each case associated master processing component M-ATM30 and primarily intended for forwarding to the switching matrix parts SN0 and, respectively, SN1. Internal comparators, not shown here, of the checker processing components compare the input signals received in this way with internal signals generated as output signals and output a corresponding error message if inequality is found.

However, the master/checker configuration described is not a prerequisite for the application of the method according to the invention.

A dashed line crossing through the block diagram representation of the processing components C-ATM30 and M-ATM30 of the two processing units CTR0 and CTR1 indicates that the ATM information received from switching matrix parts SN0 and SN1 occur with a receive clock RXCK0/1 and that the processing of this information takes place at an internal system clock SCLK independent of this. The information is sent out towards the switching matrix parts with the TxD0 and TxD1 clock, respectively. Since the processing units and, respectively, their processing components are intended to operate microsynchronously, special measures must be taken for transferring the ATM information from one clock system to the other. These consist in the mutual exchange of synchronization signals MSO between the associated processing components, which in each case act as synchronization input signal MSI. Since, moreover, the received information can be affected differently by transmission errors on the way from the switching matrix parts SN0 and SN1 to the processing units or, respectively, the information processing results per se can be faulty, which can be detected by monitoring devices not shown, further measures must be taken for maintaining the microsynchronous operation. These measures consist in each case, in the case of the reception of correct ATM information and in the case of the presence of an error-free information processing result, in the processing units outputting to the partner unit a synchronization signal RSO identifying their own processing phase. The synchronization signal is received as synchronization signal RSI to which the beginning of the processing phase of the partner unit is synchronized. The lack of a synchronization signal from the partner unit at the affected processing unit leads to the received information being discarded as in the case of the reception of faulty ATM information even in the case of the correct reception of an ATM information item, and blank information is output as processing result. These processes are controlled by the control signals RSDIR and RSDIS supplied by the central processing unit.

The indicated measures for ensuring the microsynchronous parallel operation of the processing units and, respectively, their processing components are the subject matter of a co-pending patent application having the same priority.

The parts of the processing components of the processing units which are under the influence of the internal system clock SCLK contain bus interfaces B-I via which a central processing unit LC can be reached. To check the microsynchronous parallel operation of the processing units and, respectively, their processing components, received ATM information is supplied via these bus interfaces to the central processing unit LC on request for performing a comparison.

The aforementioned transmission errors and possibly other errors such as synchronization errors which are detected in the processing components C-ATM30 and M-ATM30 there lead to the implementing of error counters. This therefore produces error statistics data, the evaluation of which is also a task of the abovementioned central processing unit LC.

Since normally these error statistics data are different in the two processing units, forwarding of these data via the abovementioned bus interfaces B-I, which leads to a comparison as explained, would lead to the signalling of a loss of microsynchronism even though there is no such loss at all.

According to the invention, the procedure adopted is that the error statistics data, just like ATM information to be output to the switching matrix parts SN0 and, respectively SN1 from the processing components as a result of the information processing, are packed into ATM transmitter cells in the processing components and are output to the switching matrix parts. Appropriate entries in the headers of these special ATM transmitter cells result in respective addressing to the processing component which has sent out the cells. The headers also contain a bit pointing to the special nature of the ATM cells. Because of the duplication of the processing units CTR0 and CTR1 as described, the statistics data, after appropriate switching through the switching matrix, simultaneously pass to all processing components of both processing units as ATM receiver cells. Assuming error-free transmission to these processing components, these cells can then be read out via the bus interfaces B-I like the remaining ATM receiver cells processed for the purpose of checking the microsynchronous parallel operation and can be supplied to an analysis by the central controller without a loss of microsynchronism being erroneously signalled.

When the two processing units CTR0 and CTR1 operate in active/standby mode, the processing unit which is in the standby state sends out only blank information in the ATM transmitter cells. The decision about which of the processing units assumes the active state and which assumes the standby state here depends on the binary state of a control bit supplied by a higher-level controller and present at the processing unit. In normal operation, an internal control command bit which is connected with the formation of the ATM transmitter cells, has the same binary value as the abovementioned external control command bit supplied by the higher-level controller, with the consequence that ATM transmitter cells with ATM information are formed. In the case of the processing unit operating in standby mode, this internal control command bit exhibits the opposite binary value as the external control command bit influencing this processing unit, with the abovementioned consequence of a sending-out of ATM transmitter cells which contain blank information.

In deviation from this normal operation, in the case of the processing unit operating in standby mode, the abovementioned control command bit is deliberately inverted for forming these cells in the case of the intended sending-out of error statistics data in ATM transmitter cells so that the processing unit, in deviation from its normal behaviour in standby mode, sends out ATM transmitter cells which are filled with such statistics data. No switching-over from active mode to standby mode by the higher-level controller by means of the abovementioned external control command bit is therefore required.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for reading out error statistics, the error statistics data being produced in duplicated first and second processing units for processing ATM information operated in microsynchronous parallel operation and connected to a duplicated switching matrix, comprising the steps of:

outputting a synchronization signal, for generating microsynchronous parallel operation, from each of the processing units, the synchronization signal identifying a respective processing phase of one processing unit to the other processing unit when there is freedom from errors of a received ATM information item to be processed and when there is freedom from errors of an information processing result to be output, to which synchronization signal a beginning of a processing phase of the other processing unit is synchronized;

effecting in one of the processing units, for a lack of a synchronization signal from the other of the processing units, a stopping of information processing even for correct reception of an ATM information item just like during reception of a faulty ATM information item, or, respectively, outputting blank information item even for an undisturbed information processing result, the processing units also being connected via a bus interface to a central processing unit, which at least evaluates the statistics data reaching the central processing unit;

supplying information coming from a switching matrix part of the duplicated switching matrix to each of the processing units and information sent out by a processing unit being supplied to all existing switching matrix parts;

comparing for a match, for monitoring microsynchronous operation of the processing units, information items output by each of the processing units via the bus interface;

inserting the error statistics data in the processing units like processing results into ATM transmit cells which are sent to the switching matrix and which are addressed to a point of origin of the ATM transmit cells and, after corresponding switching-through, again reach a respective processing unit as ATM receive cells and reach the central control unit via a respective bus interface like other ATM information.

2. The method according to claim 1, wherein for an active/standby mode of the processing units, in which a respective processing unit which is in the standby mode, sends blank information in the ATM information cells, a sending-out of statistics data by the respective processing unit is effected by an internal control command bit which initiates sending-out of ATM cells with blank information for a match or non-match, depending on specification, with an external control command bit supplied by a higher-level controller and determining the standby mode of the respective processing unit, selectively for the ATM cells into which the statistics data is to be inserted, is to be inverted compared with a state assumed in standby mode.

* * * * *